US012652197B2

(12) United States Patent (10) Patent No.: US 12,652,197 B2
Farmanbar et al. (45) Date of Patent: Jun. 9, 2026

(54) METHOD FOR AI-BASED CHANNEL ESTIMATION WITH VARYING PRB SET SIZE

(71) Applicant: Dell Products L.P., Round Rock, TX (US)

(72) Inventors: Hamidreza Farmanbar, Ottawa (CA); Gwenael Poitau, Montreal (CA); Evgeny Paltin, Montreal (CA)

(73) Assignee: Dell Products L.P., Round Rock, TX (US)

( * ) Notice: Subject to any disclaimer, the term of this patent is extended or adjusted under 35 U.S.C. 154(b) by 68 days.

(21) Appl. No.: 18/777,413

(22) Filed: Jul. 18, 2024

(65) Prior Publication Data

US 2026/0025294 A1      Jan. 22, 2026

(51) Int. Cl.
H04L 25/02 (2006.01)
(52) U.S. Cl.
CPC ........ H04L 25/0254 (2013.01); *H04L 25/025* (2013.01)
(58) Field of Classification Search
CPC ........................... H04L 25/0254; H04L 25/025
See application file for complete search history.

(56) References Cited

U.S. PATENT DOCUMENTS 10,833,785 B1 * 11/2020 O'Shea ................. H04L 5/0048
2024/0056336 A1 * 2/2024 Zirwas ................ H04L 25/0204
2024/0372755 A1 * 11/2024 Choi ....................... G06N 3/044
2025/0062936 A1 * 2/2025 Medeiros .............. H04L 5/0051
2025/0088232 A1 * 3/2025 Hao ..................... H04L 25/0254
2025/0173545 A1 * 5/2025 Cammerer ............... G06N 3/04

FOREIGN PATENT DOCUMENTS

WO     WO-2021228743 A1 * 11/2021 ........... G06N 3/0499
WO     WO-2024083303 A1 * 4/2024 ......... H04L 25/0254

OTHER PUBLICATIONS

Machine translation of CN-111464465-A (Year: 2020).*
3GPP TR 38.843, Study on Artificial Intelligence (AI)/Machine Learning (ML) for NR air interface (Release 18), Oct. 2023.
E. Dahlman, S. Parkvall, J. Skold, 5G NR the next generation wireless access technology, p. 175, 2018.

* cited by examiner

*Primary Examiner* — Jean B Corrielus
(74) *Attorney, Agent, or Firm* — Workman Nydegger

(57) ABSTRACT

One example method includes receiving, by a pre-processing unit, a rough channel estimated array, splitting, by the pre-processing unit, the rough channel estimated array into a group of smaller arrays that each have a size that is smaller than a size of the rough channel estimated array, providing, by the pre-processing unit, the smaller arrays to a single NN (neural network), processing, by the NN, the smaller arrays to generate respective refined channel estimation outputs for each of the smaller arrays, and combining, by a post-processing unit, the smaller arrays having the respective refined channel estimation outputs to generate an output array with a size that is the same as the size of the rough channel estimated array.

20 Claims, 8 Drawing Sheets

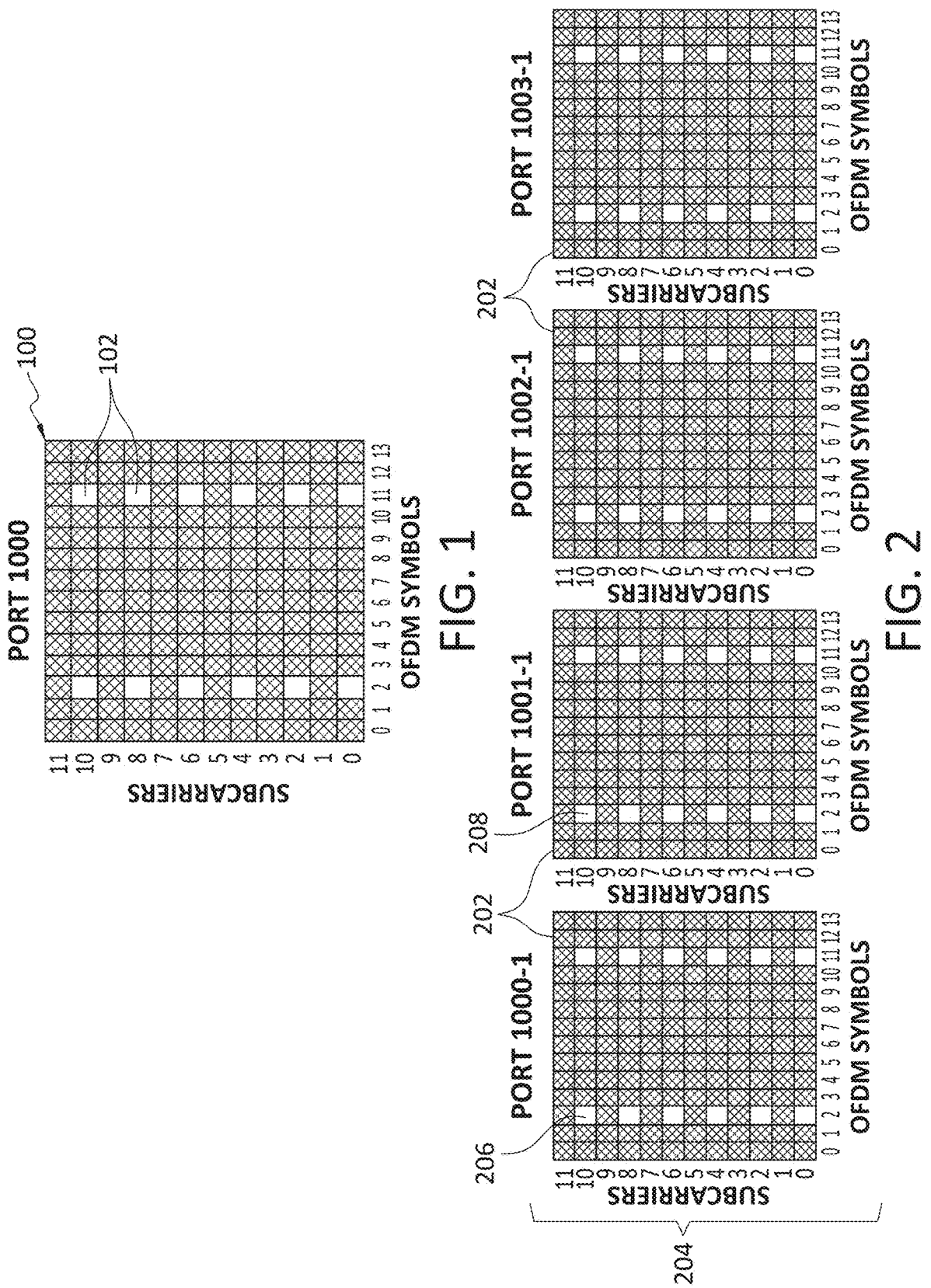

METHOD FOR AI-BASED CHANNEL ESTIMATION WITH VARYING PRB SET SIZE

TECHNOLOGICAL FIELD OF THE DISCLOSURE

Embodiments disclosed herein generally relate to communication systems. More particularly, at least some embodiments relate to systems, hardware, software, computer-readable media, and methods, for channel estimation in scenarios that may involve PRBs (physical resource blocks), and/or other elements, of varying sizes.

BACKGROUND

Neural networks (NN) are sometimes used to find solutions to channel estimate problems. However, a problem with conventional approaches is that NN-based channel estimation processes is that a single NN architecture cannot address all possible channel estimation problem sizes. In particular, the fixed input and output layer size of a given NN only match a specific channel estimation problem size. The existing AI (artificial intelligence)/ML (machine learning)-based methods specify a NN architecture that matches a specific channel estimation problem size, that is, a pre-defined PRB set size, number antennas, and train the NN with channel sample data corresponding to the pre-defined input parameters. It is evident that such a trained NN cannot be used for another channel estimation problem with different input parameters.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

FIG. 1 discloses aspects of OFDM symbols for 5G NR DM-RS assigned to resource elements in a PRB.

FIG. 2 discloses aspects of 5G NR DM-RS for 4 antenna ports.

DETAILED DESCRIPTION OF SOME EXAMPLE EMBODIMENTS

Figures 3, 4:
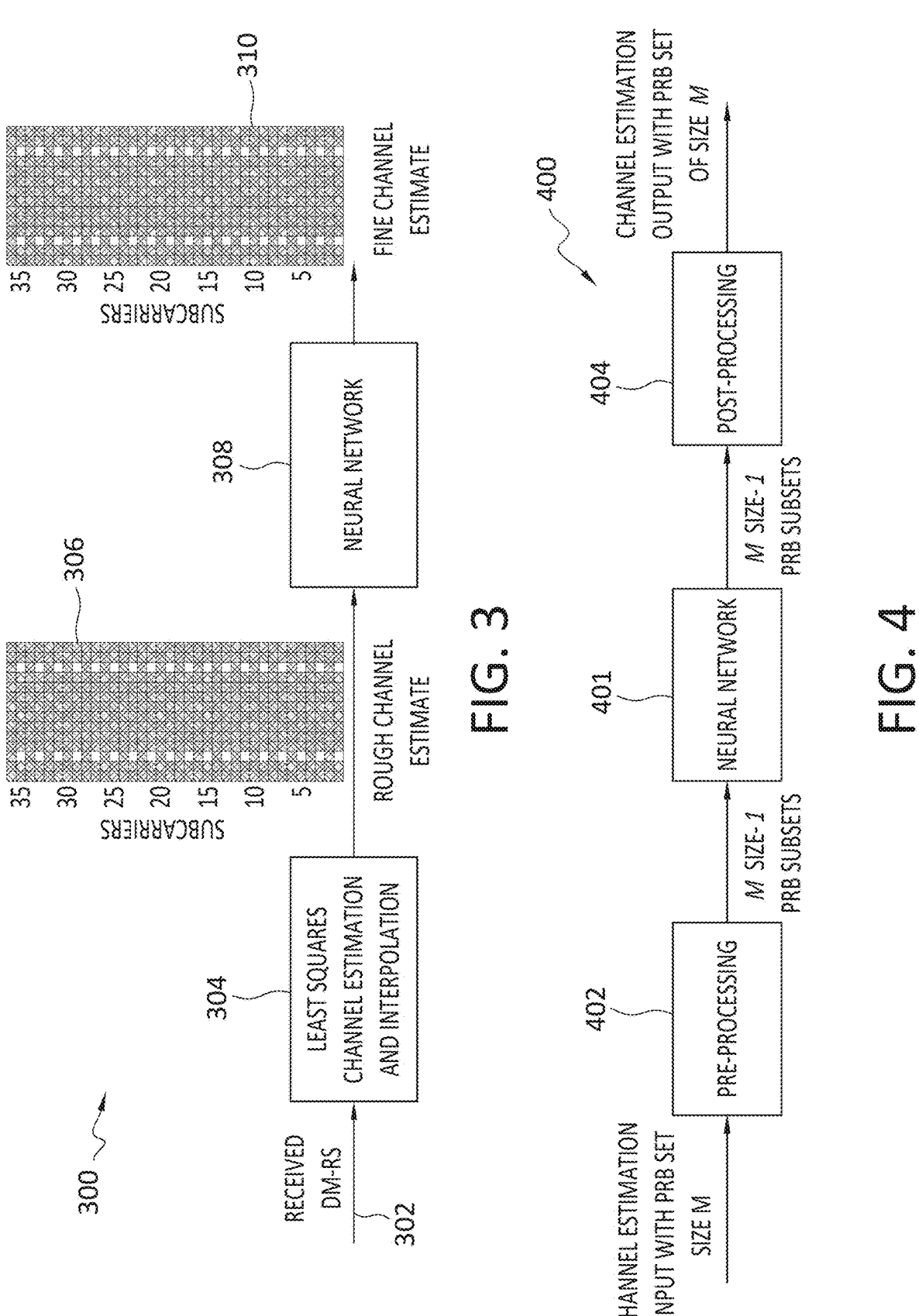
FIG. 3 discloses a comparative example of an approach to NN-based channel estimation.
FIG. 4 discloses a method involving the use of a single NN, according to one embodiment.

Embodiments disclosed herein generally relate to communication systems. More particularly, at least some embodiments relate to systems, hardware, software, computer-readable media, and methods, for channel estimation in scenarios that may involve PRBs (physical resource blocks) of varying sizes.

One example embodiment includes a method for using an NN (neural network) to perform a channel estimation. In one embodiment, the method, which may be performed in connection with an arbitrary PRB (physical resource block) set size comprises operations including: splitting, possibly using a pre-processing unit, the channel estimation input array into M arrays of size 1 in terms of PRBs; estimating, using the NN and appropriate input/output layer sizes, the channel at each of the size-1 arrays in a serial manner; and combining, possibly using a post-processing unit, the estimated channel corresponding to each of size-1 arrays to form the channel estimation output array of size M, that is, an output array that matches the size of the original PRB set. Various additional example embodiments are disclosed elsewhere herein.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that an embodiment may perform channel estimations for channel estimation problems of various respective sizes. An embodiment may perform the splitting of a channel input array in the time dimension in order to add flexibility in AI/ML channel estimation in terms of varying mini-slot size.

Various other aspects of one or more example embodiments will be apparent from this disclosure.

A. Glossary of Terms

Following is a glossary of terms used throughout this disclosure.

| Term | Definition |
|------|------------|
| NR | New Radio |
| DM-RS | Demodulation reference signal |
| RRC | Radio resource control |
| CDM | Code division multiplexing |
| TDM | Time division multiplexing |
| FDM | Frequency division multiplexing |
| RE | Resource element |
| RB | Resource block |
| PRB | Physical resource block |
| IE | Information element |
| CS | Channel state information |
| TDD | Time division duplex |
| AI | Artificial intelligence |
| ML | Machine learning |
| MIMO | Multiple input multiple output |
| MU-MIMO | Multi-user MIMO |
| SISO | Single input single output |
| PUSCH | Physical uplink shared channel |
| OFDM | Orthogonal frequency division multiplexing |
| SIMO | Single input multiple output |
| MIMO | Multiple input multiple output |
| SU-MIMO | Single-user multiple input multiple output |
| MU-MIMO | Multi-user multiple input multiple output |
| SISO | Single input single output |
| PUSCH | Physical uplink shared channel |
| SIMO | Single input multiple output |

B. Context for an Example Embodiment

The following is a discussion of aspects of an example context for one or more embodiments. This discussion is not intended to limit the scope of the claims or this disclosure, or the applicability of the embodiments, in any way.

Recent research from academia and industry shows the potential benefits of using AI/ML in 5G NR physical (PHY) layer procedures and algorithms. Given the potential of AI/ML, 3GPP started a study item on AI/ML in 2022 continuing into work item in 2024 with initial set of use cases including channel state information (CSI) feedback enhancement, beam management, and positioning accuracy enhancements, as disclosed in "3*GPP TR* 38.843, *Study on Artificial Intelligence (AI)/Machine Learning (ML) for NR air interface (Release* 18), 2023-10," which is incorporated herein in its entirety by this reference.

In coherent communication, channel knowledge is needed at the receiver in order to detect the transmitted modulated symbols. Channel knowledge at the receiver is realized by transmitting pilot symbols along with data symbols. The pilot symbols are known to the receiver. The receiver estimates the channel using the received pilot symbols, which have gone through the channel.

In 3GPP terminology, the pilot symbols designed for the purpose of symbol demodulation at the receiver are referred to as "demodulation reference signal" (DM-RS). In OFDM, DM-RS are assigned to resource elements (RE) within a physical resource block (PRB) according to specific patterns specified in 5G NR standards. FIG. 1 (see also, FIG. 11) shows an example DM-RS configuration in a PRB 100. In general, the PRB 100 may comprise, or be thought of as, a grid structure in which the vertical axis indicates frequencies, or subcarriers, while the horizontal axis indicates time slots. DM-RS symbols (light color) 102 are distributed across a 2D grid of subcarriers (vertical axis) and OFDM symbols (horizontal axis), also referred to as a 2D frequency-time grid, according to configurable periodicities in order to provide acceptable channel estimation accuracy depending on wireless channel frequency/time selectivity.

In multiple-input multiple-output (MIMO) transmission scenarios where multiple transmit layers of data are transmitted, the channel corresponding to each layer must be estimated at each receiver (Rx) antenna. This adds two more dimensions to the channel grid that must be estimated, that is, the channels, and the layers. In a MIMO scenario, multiple DM-RS are transmitted corresponding to different transmit antenna ports. The DM-RS corresponding to different antenna ports are separated (not interfering) either in time, frequency, or code domain. DM-RS are assigned to resource elements (RE) within a physical resource block (PRB) according to specific configurations specified in 3GPP NR standard.

FIG. 2 (see also, the example 1200 of FIG. 12) shows an example DM-RS mapping in respective PRB grids 202 for four DM-RS antenna ports 204 to support up to 4-layer uplink transmission. As can be seen, and by way of illustration, DM-RS on ports 1000-1 and 1001-1 are transmitted on the same REs 206 and 208, respectively, and thus interfere with each other. The same is true for DM-RS transmitted on ports 1002-1, 1003-1. The interference across the two ports may be resolved using a code division multiplexing (CDM) operation.

DM-RS symbols are spread across subcarriers and OFDM symbols according to different periodicities. The DM-RS density across subcarriers is configurable using parameter DM-RS type. The DM-RS density across OFDM symbols is also configurable by up to 4 OFDM symbols in a slot. A dense DM-RS pattern results in more accurate channel estimation performance at the price of occupying more resources within PRBs that could be used for data transmission otherwise.

Any channel estimation algorithm uses as input the received signal corresponding to DM-RS positions. However, for data symbol demodulation, channel estimates are needed at REs where data symbols are transmitted. Therefore, the channel estimation involves the use of interpolation/extrapolation to find channel estimates at all RE locations within a frequency-time grid.

C. Some Aspects of One Example Embodiment

Following is a discussion of aspects of one example embodiment, with reference to various challenges that may be resolved by one or more embodiments. This discussion is not intended to limit the scope of this disclosure, or any claim, in any way.

A 5G NR channel estimation algorithm may take a set of parameters as input such as:

scheduled bandwidth for the UE: Configured by 3GPP 5G NR RRC IE pusch.PRBSet/pdsch.PRBSet;
   number of transmission layers: Configured by 3GPP 5G NR RRC IE pusch.NumLayers/pdsch.NumLayers; and
   number of Rx antennas.

These input parameters impact the channel estimation problem size/dimensions. In particular, a channel estimation algorithm input and output dimensions may be dependent on the input parameters as follows:

channel estimation input: Sparse 3-D array of received signal with dimensions (K, N, R) corresponding to DM-RS positions (FIG. 1 shows the first two dimensions); and channel estimation output: 4-D array of estimated channel with dimensions (K, N, R, L)

Here, K and N define the UE (user equipment) PRB set scheduled for transmission, R=number of receiver (Rx) antennas, L=number of transmit layers. Denoted by $K_1$ is the number of DM-RS symbols in the PRB set per pilot-carrying OFDM symbols, and by $N_1$ the number of OFDM symbols carrying pilots in a slot. As an example, if the PRB set of a UE one PRB, as in the example of FIG. 1, then for that PRB, K=12, N=14, $K_1$=6, and $N_1$=2.

As noted herein, one aspect of an example embodiment is the ability to address various different, and possibly all, channel estimation problem sizes. To further illustrate this, reference is made now to FIG. 3.

In particular, FIG. 3 discloses a block diagram 300 of a NN-based channel estimation method, for the purposes of comparison. The input 302 is the received DM-RS in the sparse 3-D array of size (K, N, R). In this example, K=36 (3 PRBs), N=14, R=1. Given the received DM-RS, the channel corresponding to DM-RS positions in the array is estimated using a least squares (LS) algorithm 304. Then interpolation is used to obtain rough channel estimates 306 in all points of the 4-D channel array (36, 14, 1, 1). Then a NN 308 that is dimensioned for, and trained with, channel samples with the above given dimensions (36, 14, 1, 1) is used to obtain fine channel estimates 310.

By way of contrast, one embodiment addresses the variable size of UE scheduled PRB set size configured by pusch.PRBSet/pdsch.PRBSet. For example, a 5G NR gNB with total bandwidth of 50 MHz can support 270 RBs. The data transmitted by a UE can be scheduled given any number of RBs from 1 to 270 PRBs depending on the UE required data rate. Designing and training 270 NNs to cover all possible scheduled UE PRB set sizes for channel estimation is unrealistic. Thus, one embodiment comprises a method to reduce the number of NN architectures needed to cover for varying UE scheduled PRB set sizes. In one particular embodiment, a single NN architecture may be used to perform channel estimation for various UE scheduled PRB set sizes.

D. Detailed Discussion of Some Example Embodiments

In one embodiment, a method is defined and implemented that operates to address the varying PRB set size works. In an embodiment, this method may be implemented using various components including, but not limited to:

a pre-processing unit which takes in the rough channel estimate array provided by LS channel estimation and interpolation and splits the rough channel estimate array into multiple smaller fixed-size arrays;

a NN which is properly dimensioned and trained to process the smaller fixed-size arrays; and a post-processing unit which takes in the output of the NN for each of the processed smaller a fixed-size arrays at combines them into a single array whose size is the same as the original PRB set size.

D.1 Example Embodiment Using a Single NN

In this example embodiment, a single NN is used for channel estimation for any arbitrary PRB set size. For example, let M denote the PRB set size corresponding to the channel estimation input array. The channel estimation input array may then be split into M arrays of size 1, that is, in terms of PRBs. A NN with appropriate input/output layer sizes then estimates the channel at each of the size-1 arrays in a serial manner, that is, array by array. Then the respective estimated channels corresponding to each of size-1 arrays are combined to form the channel estimation output array of size M. FIG. 4 discloses a block diagram of an example of this method, denoted at 400, where only a single NN 401 is used, and the PRB splitting and combining takes place in pre-processing and post-processing units 402 and 404, respectively.

In more detail, the example method 400 operations performed on the rough channel estimate, obtained through LS estimation and interpolation, with dimensions (K, N, R, L), where K=12×M, may be as follows:

pre-processing 402—split the roughly estimated array of size (K, N, R, L) into M arrays with size (K/M, N, R, L); and post-processing 404—given the channel estimation outputs by NN for each array of size (K/M, N, R, L), combine the M arrays of size (K/M, N, R, L) into one array of size (K, N, R, L).

It is noted with regard to the training of the NN that the training channel samples must go through the same pre-processing 402/post-processing 404 operations set forth above. Thus, suppose that the channel sample training data/labels is denoted by a 5-D array (K, N, R, L, numSamples), where numSamples is the number of channel training samples. After pre-processing, the 5-D array is transformed into an array of size (K/M, N, R, L, M×numSamples).

D.2 Example Embodiment Using a Bank of NN Architectures

An example embodiment using a bank of NN architectures, rather than a single NN, may be applied in situations to which a single NN architecture may not be best suited. For example, a single NN architecture may be unable to utilize channel correlation across subcarriers beyond 1 PRB. This circumstance can be overcome by increasing the size of the split PRB set. However, this increase in size comes at the cost of increasing the number of NN architectures to be used for channel estimation.

For example, denote the size of a split PRB set by S, where S may be selected to be much smaller than the maximum number of PRBs supported by the system bandwidth. Then, split the original PRB set of size M PRBs into multiple PRB subsets each of size S PRBs. As M may not be divisible by S, there may remain a PRB set of size r as a result of splitting, where 0≤r<S. In such a case, in addition to a NN that can handle size S PRB subsets, an additional NN may be used to handle size r PRB subsets. As M varies, r can take any value in the range 0 to S−1. Therefore, in this example embodiment, a bank of NNs is used in order to estimate the channel with arbitrary PRB set size.

Figures 5, 6:
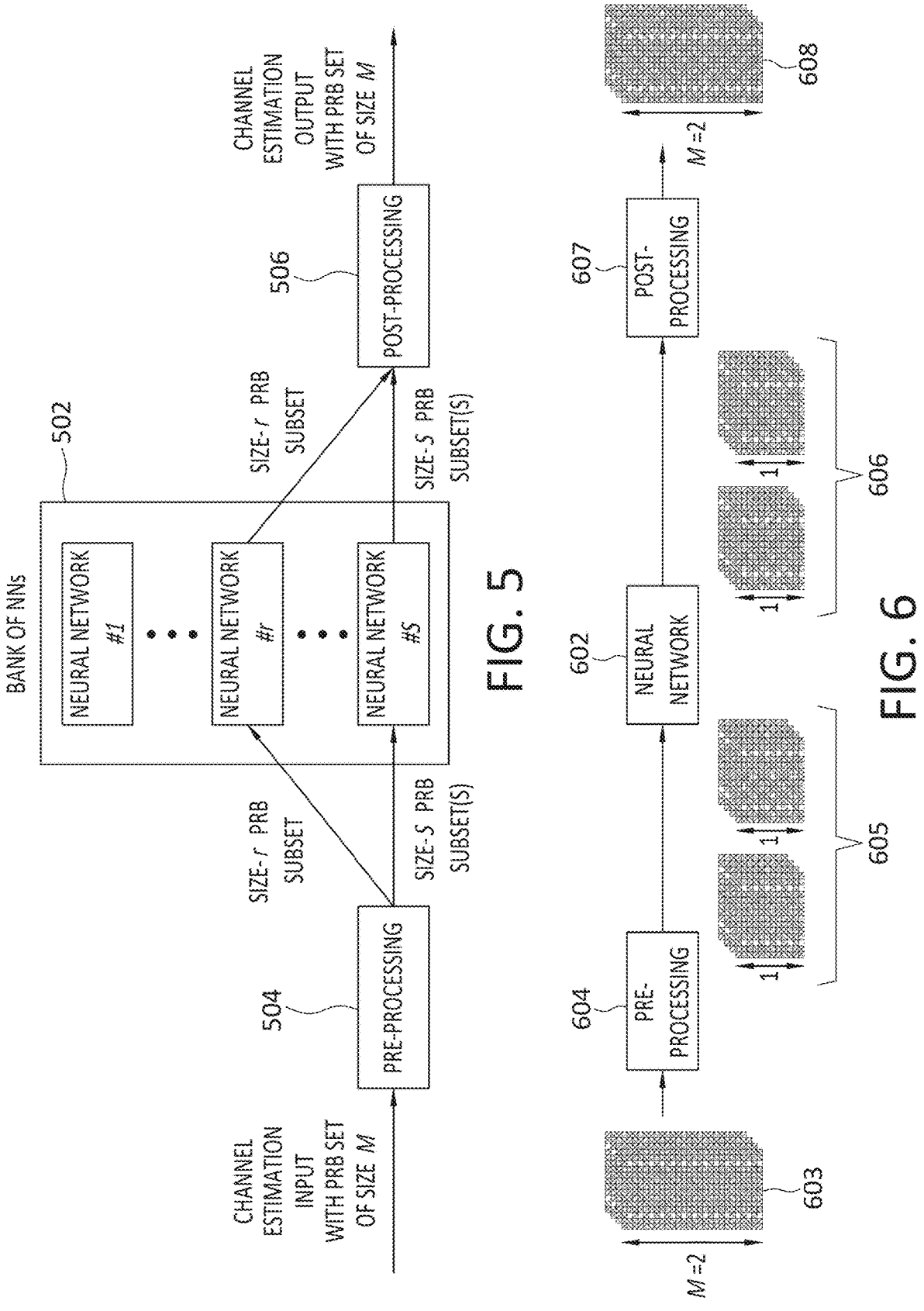
FIG. 5 discloses a method involving the use of a bank of NNs, according to one embodiment.
FIG. 6 discloses an example use case for the embodiment disclosed in FIG. 4.

With particular reference now to the example of FIG. 5, a configuration and method are disclosed that utilize a bank 502 of NNs, where NN #i can process a size-i PRB subset. The input array corresponds to a size-M PRB set. In a pre-processing unit 504, the input PRB set is split into zero, or one, or multiple size-S PRB subset(s) and one size-r PRB subset (if r>0), where r is the remainder of M divided by S. The channel is then estimated for each size-S PRB subset by NN #S of the bank 502 of NNs, and the channel is estimated for the size-r PRB subset by NN #r. A post-processing unit 506 then combines the estimated PRB subsets to obtain the channel estimation array corresponding to size-M PRB set.

D.3 Example Embodiment Using Generalized PRB Set Splitting

The example embodiment discussed above utilizes a bank of NNs each processing one of the PRB subset sizes 1, 2, . . . , S, where (up to) two of those NNs are used at any instance of channel input depending on the channel input size. In general, an embodiment may use a given number of NNs where each NN processes a distinct PRB subset size, and where the subset sizes are not bound to be 1, 2, . . . , S. For example, consider a bank of 3 NNs each processing one of PRB subset sizes 1, 2, and 4, and suppose the channel input array has a PRB set size of 11. Then the input PRB set would be split by the bank of NNs into one size-1, one size-2, and two size-4 PRB subsets.

D.4 Example Embodiment with Overlapping PRB Subsets

In the example embodiments discussed above, the input PRB set is split into disjoint PRB subsets. In some circumstances however, splitting the input PRB set into disjoint PRB subsets may cause the channel estimation accuracy to suffer for REs at the edge of the PRB subsets, as the channel estimation for those REs does not fully benefit from correlation across subcarriers. This can be overcome by splitting the input PRB set into overlapping PRB subsets. The amount of overlap across PRB subsets can range from a few REs up to a few PRBs. In the post-processing unit, the channel estimates corresponding to overlapped REs can then be linearly combined

D.5 Further Discussion

As disclosed herein, embodiments may be advantageous at least insofar as they employ a splitting methodology of the channel input array in the subcarrier dimension, that is, PRB set splitting in order to add flexibility in AI/ML channel estimation in terms of varying input PRB set size. This may be realized through specific operations introduced in the pre-processing and post-processing units before and after NN, as discussed herein. It is noted that the splitting and combining operations that are introduced in this disclosure may imply certain input/output dimensions for the NN(s) to be used along with pre-processing and post-processing.

E. Example Use Cases

Following is a discussion of example use cases for one or more of the disclosed embodiments. These use cases are provided for the purpose of illustration and are not intended to limit the scope of the disclosure or any claims in any way.

E.1 Example Use Case 1

FIG. 6 discloses an example application of an embodiment that uses only a single NN 602. In this example, the UE is scheduled over M=2 PRBs (K=24 REs) for PUSCH transmission. The input 603 to a pre-processing unit 604 is LS-estimated and interpolated channel grid, that is, a rough channel estimate. The input 603 array in this example is a 4-D array (K=24, N=14, R, L=4) where only the first, second, and fourth dimensions are shown in FIG. 6. A pre-processing unit 604 splits the input array in the first dimension 605 as shown. The NN 602 is dimensioned and trained to estimate channel with size-1 PRB subsets as the first dimension. The NN 604 estimates the channel for each PRB subset 606 in a serial manner to obtain a fine channel estimate. A post-processing unit 607 combines the size-1 fine channel estimates into an array 608 having the original dimensions of the input 603 array.

E.2 Example Use Case 2

Figures 7, 8:
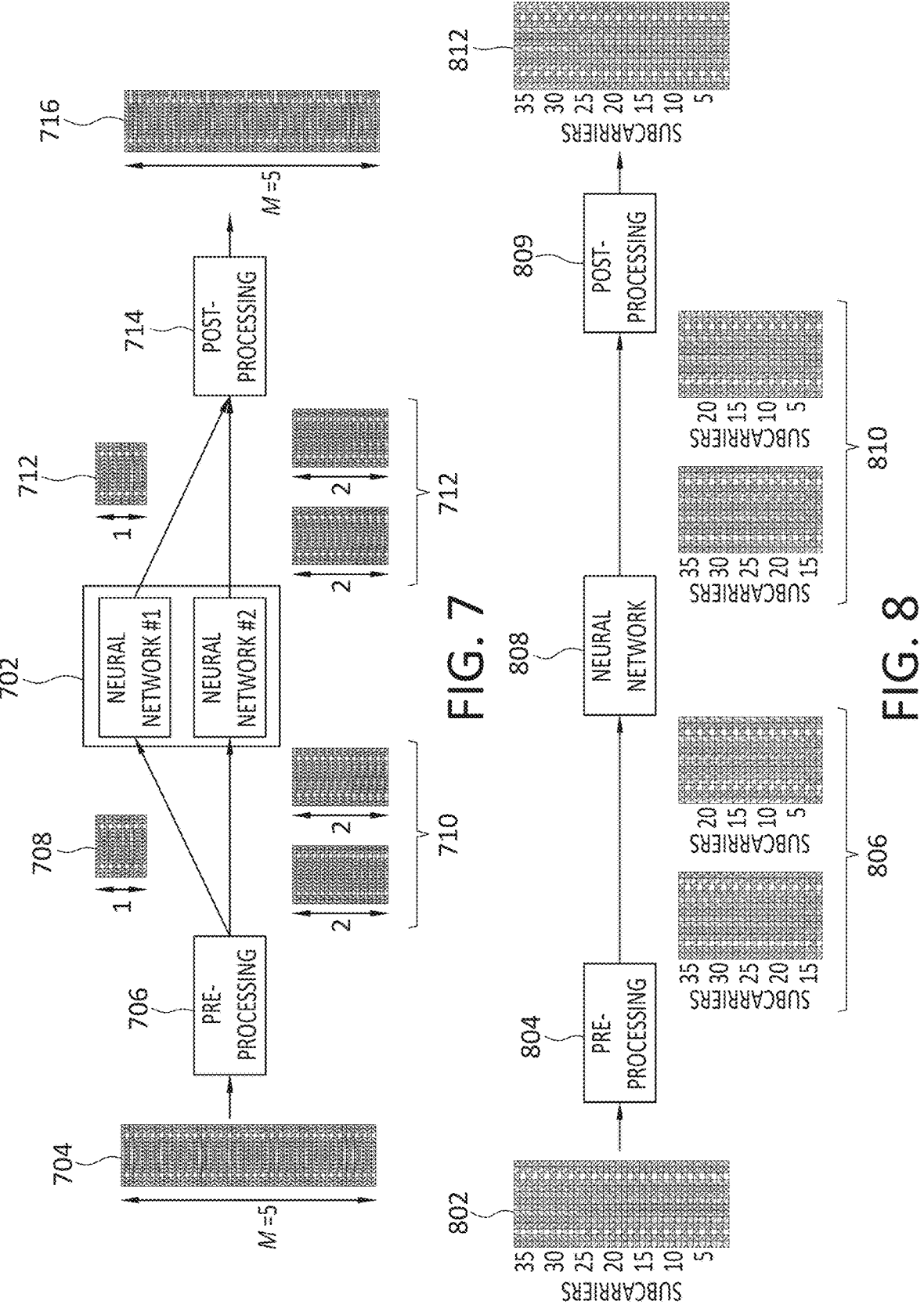
FIG. 7 discloses an example use case for the embodiment disclosed in FIG. 5.
FIG. 8 discloses an example use case for an embodiment involving overlapping PRB subsets.

FIG. 7 discloses an example application of an embodiment that employs a bank 702 of NN architectures. In this example, M=5 and S=2, and the UE is scheduled over M=5 PRBs (K=60 REs) for PUSCH SISO transmission, i.e., R=L=1. As in the preceding example, the input 704 to a pre-processing unit 706 is and LS-estimated and interpolated channel grid, that is, a rough channel estimate. The input 704 array is a 2-D array (K=60, N=14) in this case. In this example, two NNs are used, where NN #1 is dimensioned for, and trained with, size-1 PRB subsets 708 and NN #2 is dimensioned for, and trained with, size-2 PRB subsets 710. It is noted that if M were an even number, only NN #2 would be need to be used in the inference phase. For odd values of M, however, both NN #1 and NN #2 are used in the inference phase.

With continued reference to the example of FIG. 7, the fine channel estimates 712 generated by the bank 702 may then be provided by the bank 702 to a post-processing unit 714. The post-processing unit 714 may then combine the size-fine channel estimates 712 into an array 716 having the original dimensions M=5 and S=2 of the input 704 array.

E.3 Example Use Case 3

FIG. 8 discloses an example application of an embodiment that operates in connection with overlapping PRB subsets. In this example, the UE is scheduled over 3 PRBs, corresponding to 36 Res, for SISO PUSCH transmission. The PRB set 802 is split, by a pre-processing unit 804, into two overlapping size-2 PRB subsets 806, one including REs numbered 1-24 and the other including REs numbered 13-36. A NN 808 is dimensioned for, and trained with, size-2 PRB subsets. The NN 808 processes the two PRB subsets 806 in serial manner, that is, one of the PRB subsets 806 is processed after the other of the PRB subsets 806. A post-processing unit 809 keeps the NN channel estimates 810 for REs numbered 1-18 from the first PRB subset and for REs numbered 19-36 from the second PRB subset and combines them into a size-3 PRB set 812. Alternatively, the post-processing unit 809 may average the NN channel estimates 810 for REs numbered 13-24 from both PRB subsets 806 and combine NN channel estimates for REs 1-12 from the first PRB subset 806, and average estimates 13-24 and NN channel estimates 25-36 from the second PRB subsets into a size-3 PRB set.

F. Additional Example Embodiments—Mini-Slot Resource Allocation

The basic architecture, example embodiments of which are disclosed herein, comprising a pre-processing unit, NN, and post-processing unit, may be applied to other contexts besides that of PRB splitting. Following is a discussion of some example applications of such an architecture in the context of AI-based channel estimation for mini-slot resource allocation.

F.1 Context for an Example
Embodiment—Mini-Slot Resource Allocation

Figures 9, 10:
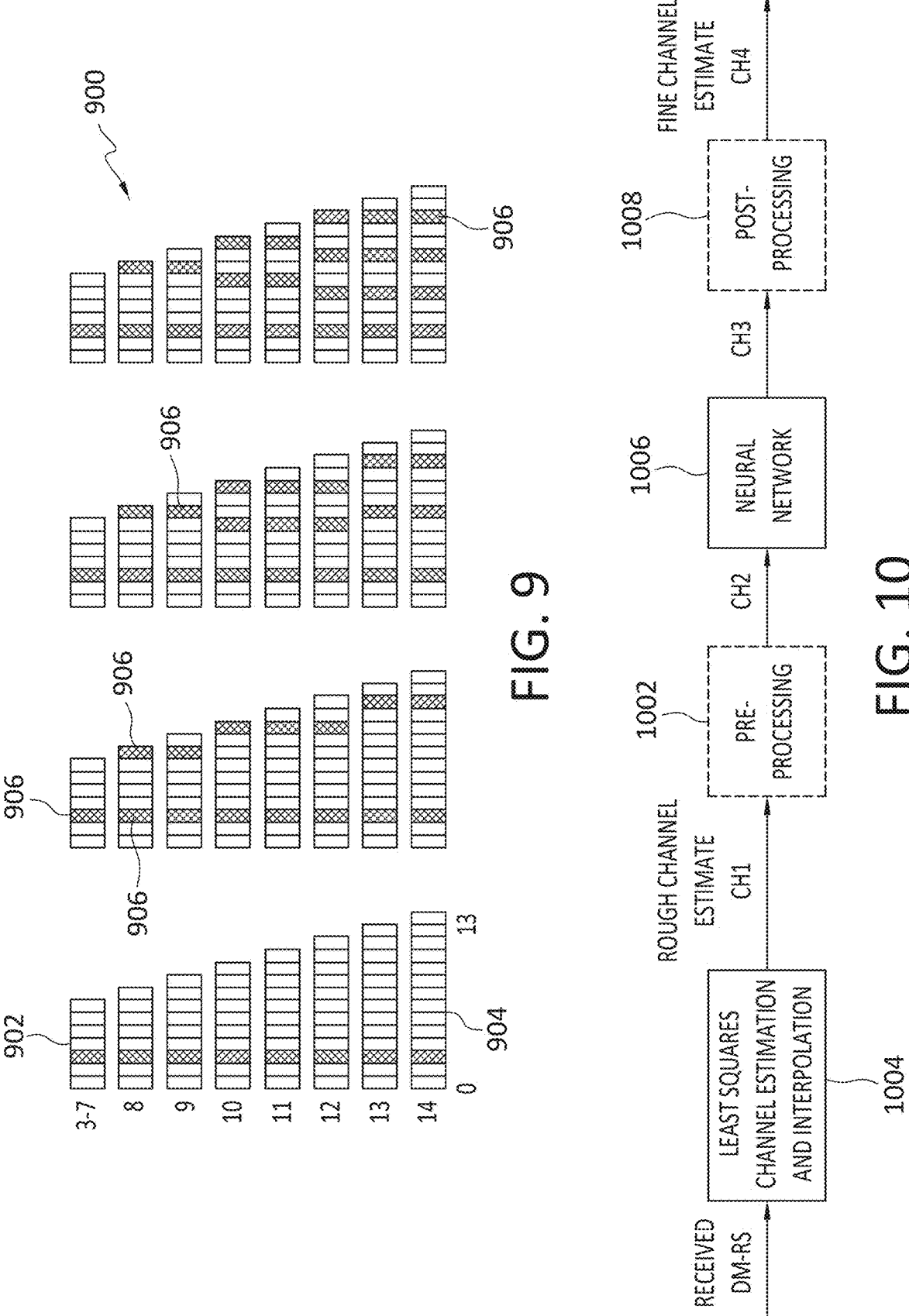
FIG. 9 discloses an example mini-slot allocation.
FIG. 10 discloses a method and configuration for AI-based channel estimation for arbitrary mini-slot size, according to one embodiment.
Figures 11, 12:
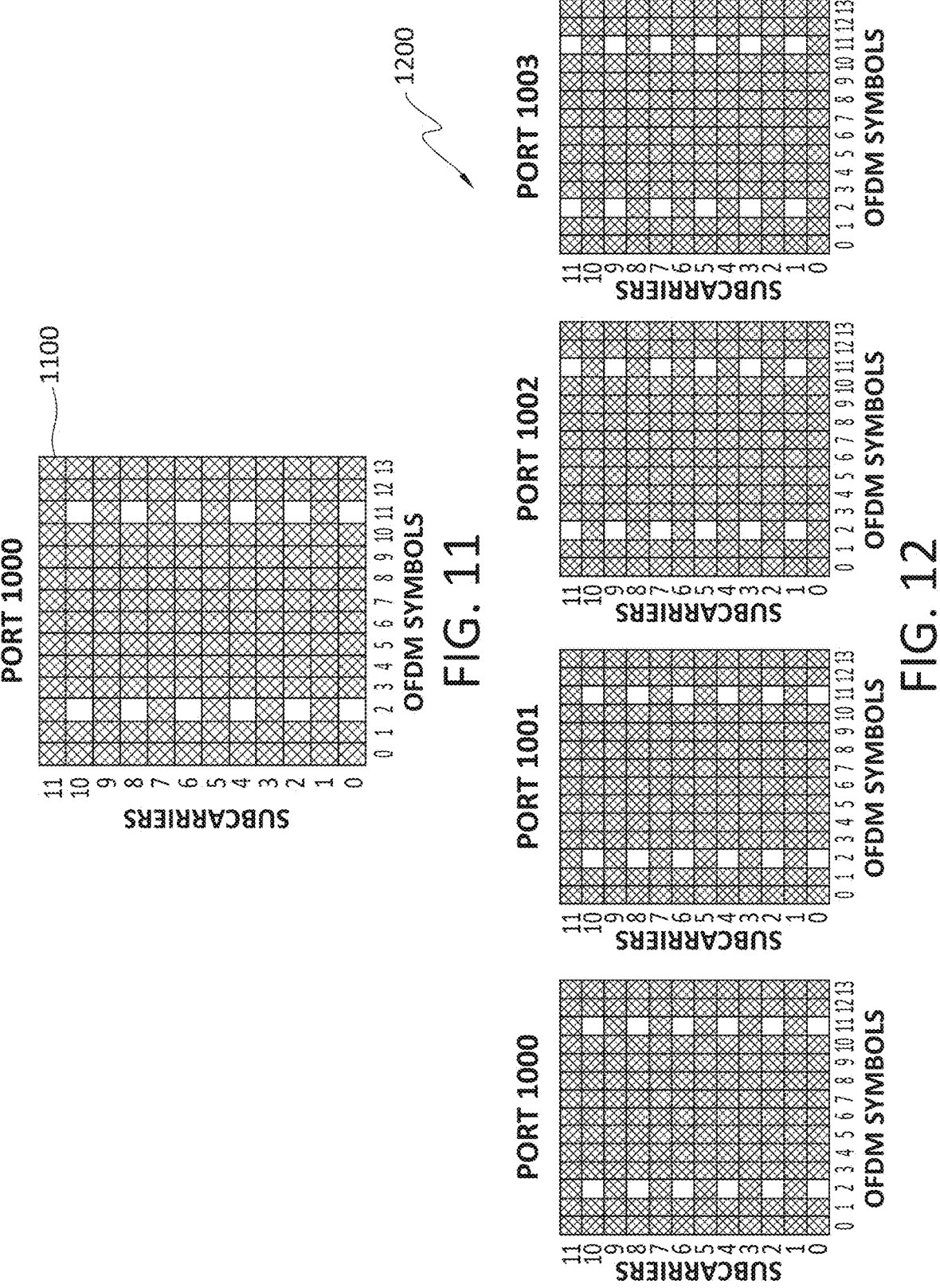
FIG. 11 discloses an example PRB with 5G NR DM-RS.
FIG. 12 discloses an example of 5G NR DM-RS for 4 antenna ports.

As noted earlier herein, including the discussion at B. above, and see also the example PRB 1100 in FIG. 11, a PRB may be thought of as comprising a grid structure, in which the horizontal axis indicates time, expressed as a grouping of slots, and the vertical axis indicates frequency, or subcarriers. In 5G NR, resource allocation, that is, allocation of transport block bits to OFDM time-frequency grid, typically takes place on a slot-level basis, where a slot is composed of 14 OFDM symbols as shown in FIG. 11, discussed below. However, NR also supports transmission over a fraction of a slot, where this fraction or partial portion is sometimes referred to as "mini-slot," and transmission using this fractional slot is referred to as mini-slot transmission. Support for mini-slot transmission may enable a more efficient approach to low latency transmission, operation in the unlicensed spectrum, and operation in the mmWave band. FIG. 9 discloses shows different resource allocations 900 ranging from mini slots 902 of size 3 up to an allocation of size 14, that is, a full slot 904. In the example of FIG. 9, DM-RS 906 is denoted by the dark portions, a few examples of which are labeled for reference.

In one example, a 5G NR channel estimation algorithm takes a set of parameters as input including the size of the resource allocation in terms of mini-slot size. However, a problem that is encountered in a NN based channel estimation is that a single NN architecture cannot address all possible channel estimation problem sizes. In particular, the fixed input and output layer size of a given NN can only match a specific channel estimation problem size. Present AI/ML-based methods specify a NN architecture that matches a specific channel estimation problem size, that is, a pre-defined mini-slot size, and train that NN architecture with channel sample data corresponding to the same mini-slot size. It is evident that such a trained NN cannot be used for another channel estimation problem with a different mini-slot size. Thus, an embodiment comprises a NN-based channel estimation method that works for arbitrary mini-slot sizes using a single NN architecture.

F.2 Overview of an Example
Embodiment—Mini-Slot Resource Allocation

As shown in the example of FIG. 10, an example embodiment of an AI-based channel estimation method and architecture to address the varying mini-slot size may be implemented using various components including, but not limited to:

a pre-processing unit 1002 which takes in the rough channel estimate array CH1, with the original mini-slot size N, provided by an LS channel estimation and interpolation unit 1004 and transforms the rough channel estimate array CH1 into one or more arrays CH2 of fixed size Q, as expressed in terms of the number of OFDM symbols;

a NN 1006 which is properly dimensioned and trained to process the aforementioned arrays of fixed size Q; and a post-processing unit 1008 which takes in the output of the NN 1006 for each of the processed arrays CH3 of fixed size Q and combines them into an array CH4 that has the original mini-slot size N.

In an embodiment, an aspect of the pre-processing by the pre-processing unit 1002 is that the size of the arrays at the output of the pre-processing unit 1002 is independent of the mini-slot size. Those arrays are then processed by the NN

1006 in a serial manner. The arrays at the output of the NN 1006 are then combined, by the post-processing unit 1008, into a final channel estimate array with the same dimension as the rough channel estimate array CH1. In an embodiment then, the dependence of channel estimation problem size on mini-slot size is resolved by pre-/post-processing units 1002 and 1008, respectively, so that a single NN 1006 may be used for channel estimation for arbitrary mini-slot sizes.

As introduced above then, one example embodiment may comprise a method for splitting of the channel input array in the time dimension in order to add flexibility in AI/ML channel estimation in terms of varying mini-slot size. This functionality may be realized through specific operations introduced in the pre-processing and post-processing units before and after an NN, as shown in the example of FIG. 10. It is noted that the splitting and combining operations of one embodiment may impact the input/output dimensions for the NN to be used along with pre- and post-processing units. However, such input/output dimensions are design parameters and are independent of mini-slot size.

By way of contrast with an example embodiment, in a conventional NN-based channel estimation method, the NN is dimensioned for, and trained with, specific channel estimation problem dimensions including the mini-slot size. A problem with such an approach is that they cannot be used with a different channel estimation problem with different parameters such as mini-slot size. In other words, a new NN with different dimensions must be designed and trained for each new channel estimation problem. This is an impractical approach.

F.3 Detailed Discussion of an Example
Embodiment—Mini-Slot Resource Allocation The rough channel estimate provided by LS channel estimation and interpolation (see reference 1004 in FIG. 10, for example) may be denoted by a 5-D array CH1 with dimensions (K, N, R, L, numSamples), where, K is the number of subcarriers, N is the mini-slot size, R=number of receiver (Rx) antennas, L=number of transmit layers, and numSamples is the number of channel samples. It is noted that if the size of any of the dimensions is one (1), then CH1 may be represented as an array with smaller dimension. For example, if L=1 and numSamples=1, CH1 can be represented as a 3-D array with dimensions (K, N, R). We proposed our solution based on the most general case where CH1 has all 5 dimensions. As described earlier herein, one example method may be implemented using pre-/post-processing units as shown in FIG. 10.

F.3.1 Pre-Processing

In the pre-processing unit, such as the pre-processing unit 1002 for example, the array CH1 is turned into one or more arrays CH2 with the following dimensions.

$$CH1: (K, N, R, L, numSamples) \rightarrow CH2: (K, Q, L, R, numSamples),$$

where Q≤N. As shown in "E. Dahlman, S. Parkvall, J. Skold, *5G NR the next generation wireless access technology*, p. 175, 2018," incorporated herein in its entirety by this reference, the dimensions of CH2 do not depend on mini-slot size N. Therefore, the dimensioning of the neural network in FIG. 10, which takes CH2 as input may be performed independently of mini-slot size.

Figures 13, 14:
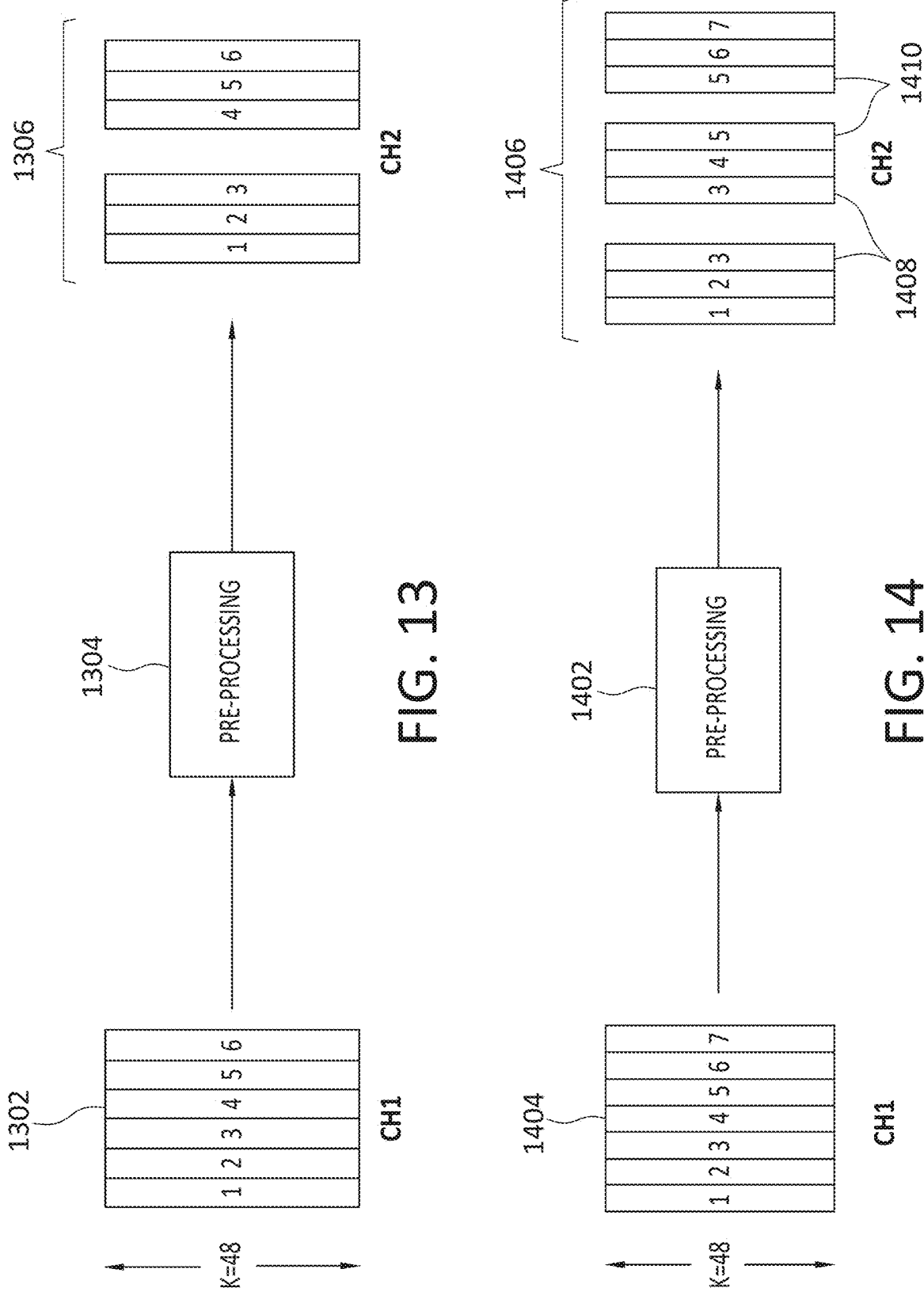
FIG. 13 discloses an example method for splitting a mini-slot into two non-overlapping arrays (N=6, Q=3), according to one embodiment.
FIG. 14 discloses an example method for splitting a mini-slot into three overlapping arrays (N=7, Q=3), according to one embodiment.

An example of pre-processing with K=48, N=6, Q=3, R=L=1, according to one embodiment, is disclosed in FIG. 13, where input array CH1 is split, by a pre-processing unit 1304, into two non-overlapping arrays CH2 1306. That is, FIG. 13 discloses splitting a mini-slot into two non-overlapping arrays (N=6, Q=3).

Another example of pre-processing, such as by a pre-processing unit 1402, with K=48, N=7, Q=3, R=L=1 is shown in FIG. 14 where input array CH1 1404 is split into three overlapping arrays CH2 1406. The overlapped parts are OFDM symbols 3 and 5, denoted respectively at 1408 and 1410, in the original mini-slot 1404. That is, FIG. 14 discloses splitting a mini-slot 1404 into three overlapping arrays (N=7, Q=3) 1406.

F.3.2 NN

In an embodiment, a NN that is dimensioned for, and trained with, samples of the same form as CH2 is used to process each sample in CH2 in a sequential manner and to provide output CH3 with the same dimensions as CH2. It should be noted that the input/output layer dimensions of NN depends on Q rather than on the original mini-slot size N.

F.3.3 Post-Processing

In an embodiment, the post processing takes the output sample arrays of NN and combines them into CH4, which has the same dimensions as CH1. In the case of non-overlapped splitting, the combining operation may simply be a concatenation. In the case of overlapped splitting, the channel estimates corresponding to overlapped OFDM symbols at the output of post-processing are obtained by linearly combining the corresponding channel estimates at the output of the NN.

G. Example Methods

It is noted that any operation(s) of any of the methods disclosed herein, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

H. Further Example Embodiments

Following are some further example embodiments. These are presented only by way of example and are not intended to limit the scope of this disclosure or the claims in any way.

Embodiment 1. A method for channel estimation, comprising: receiving, by a pre-processing unit, a rough channel estimated array; splitting, by the pre-processing unit, the rough channel estimated array into a group of smaller arrays that each have a size that is smaller than a size of the rough channel estimated array; providing, by the pre-processing unit, the smaller arrays to a single NN (neural network); processing, by the NN, the smaller arrays to generate respective refined channel estimation outputs for each of the smaller arrays; and combining, by a post-processing unit, the smaller arrays having the respective refined channel estimation outputs to generate an output array with a size that is the same as the size of the rough channel estimated array.

Embodiment 2. The method as recited in any preceding embodiment, wherein the roughly estimated array was generated by a LS (least squares) channel estimation and interpolation process.

Embodiment 3. The method as recited in any preceding embodiment, wherein the roughly estimated array comprises a PRB (physical resource block), and the output array comprises a PRB.

Embodiment 4. The method as recited in embodiment 3, wherein the respective sizes of the smaller arrays are independent of a size of the PRB, and the smaller arrays are then processed by the NN in a serial manner.

Embodiment 5. The method as recited in embodiment 3, wherein a size of the NN is independent of a size of the PRB of the roughly estimated array.

Embodiment 6. The method as recited in any preceding embodiment, wherein the roughly estimated array comprises a mini-slot of a PRB, and the output array comprises a mini-slot of a PRB.

Embodiment 7. The method as recited in embodiment 6, wherein the respective sizes of the smaller arrays are independent of a size of the mini-slot, and the smaller arrays are then processed by the NN in a serial manner.

Embodiment 8. The method as recited in embodiment 6, wherein a size of the NN is independent of a size of the mini-slot of the PRB of the roughly estimated array.

Embodiment 9. The method as recited in any preceding embodiment, wherein the NN is dimensioned for, and was trained with, samples each having a size that is the same as the sizes of each of the smaller arrays.

Embodiment 10. The method as recited in any preceding embodiment, wherein the NN is the only NN used to process the smaller arrays, and the NN is operable with rough channel estimated arrays of various different sizes.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

I. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 15:
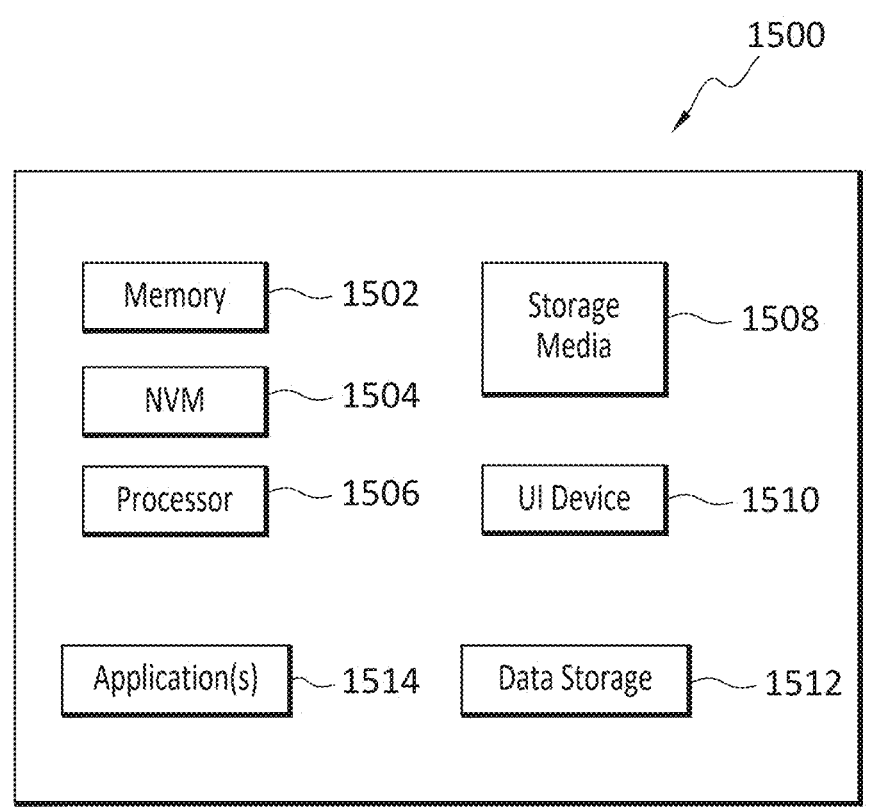
FIG. 15 discloses a computing entity configured and operable to perform any of the disclosed methods, processes, and operations.

With reference briefly now to FIG. 15, any one or more of the entities disclosed, or implied, by FIGS. 1-14, and/or elsewhere herein, may take the form of, or include, or be implemented on, or hosted by, a physical computing device, one example of which is denoted at 1500. As well, where any of the aforementioned elements comprise or consist of a virtual machine (VM), that VM may constitute a virtualization of any combination of the physical components disclosed in FIG. 15.

In the example of FIG. 15, the physical computing device 1500 includes a memory 1502 which may include one, some, or all, of random access memory (RAM), non-volatile memory (NVM) 1504 such as NVRAM for example, readonly memory (ROM), and persistent memory, one or more hardware processors 1506, non-transitory storage media 1508, UI device 1510, and data storage 1512. One or more of the memory components 1502 of the physical computing device 1500 may take the form of solid state device (SSD) storage. As well, one or more applications 1514 may be provided that comprise instructions executable by one or more hardware processors 1506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method for channel estimation, comprising:

receiving, by a pre-processing unit, a rough channel estimated array;

splitting, by the pre-processing unit, the rough channel estimated array into a group of smaller arrays that each have a size that is smaller than a size of the rough channel estimated array;

providing, by the pre-processing unit, the smaller arrays to a single neural network (NN);

processing, by the NN, the smaller arrays to generate respective refined channel estimation outputs for each of the smaller arrays; and combining, by a post-processing unit, the smaller arrays having the respective refined channel estimation outputs to generate an output array with a size that is the same as the size of the rough channel estimated array.

2. The method as recited in claim 1, wherein the rough channel estimated array was generated by a least squares (LS) channel estimation and interpolation process.

3. The method as recited in claim 1, wherein the rough channel estimated array comprises a physical resource block (PRB), and the output array comprises a PRB.

4. The method as recited in claim 3, wherein the respective sizes of the smaller arrays are independent of a size of the PRB, and the smaller arrays are then processed by the NN in a serial manner.

5. The method as recited in claim 3, wherein a size of the NN is independent of a size of the PRB of the rough channel estimated array.

6. The method as recited in claim 1, wherein the rough channel estimated array comprises a mini-slot of a physical resource block (PRB), and the output array comprises a mini-slot of a PRB.

7. The method as recited in claim 6, wherein the respective sizes of the smaller arrays are independent of a size of the mini-slot of the PRB of the rough channel estimated array, and the smaller arrays are then processed by the NN in a serial manner.

8. The method as recited in claim 6, wherein a size of the NN is independent of a size of the mini-slot of the PRB of the rough channel estimated array.

9. The method as recited in claim 1, wherein the smaller arrays produced by the splitting are overlapping arrays.

10. The method as recited in claim 1, wherein the NN is the only NN used to process the smaller arrays, and the NN is operable with rough channel estimated arrays of various different sizes.

11. A non-transitory storage medium having stored therein instructions that are executable by one or more hardware processors to perform operations comprising:

receiving, by a pre-processing unit, a rough channel estimated array;

splitting, by the pre-processing unit, the rough channel estimated array into a group of smaller arrays that each have a size that is smaller than a size of the rough channel estimated array;

providing, by the pre-processing unit, the smaller arrays to a single neural network (NN);

processing, by the NN, the smaller arrays to generate respective refined channel estimation outputs for each of the smaller arrays; and combining, by a post-processing unit, the smaller arrays having the respective refined channel estimation outputs to generate an output array with a size that is the same as the size of the rough channel estimated array.

12. The non-transitory storage medium as recited in claim 11, wherein the rough channel estimated array was generated by a least squares (LS) channel estimation and interpolation process.

13. The non-transitory storage medium as recited in claim 11, wherein the rough channel estimated array comprises a physical resource block (PRB), and the output array comprises a PRB.

14. The non-transitory storage medium as recited in claim 13, wherein the respective sizes of the smaller arrays are independent of a size of the PRB, and the smaller arrays are then processed by the NN in a serial manner.

15. The non-transitory storage medium as recited in claim 13, wherein a size of the NN is independent of a size of the PRB of the rough channel estimated array.

16. The non-transitory storage medium as recited in claim 11, wherein the rough channel estimated array comprises a mini-slot of a physical resource block (PRB), and the output array comprises a mini-slot of a PRB.

17. The non-transitory storage medium as recited in claim 16, wherein the respective sizes of the smaller arrays are independent of a size of the mini-slot of the PRB of the rough channel estimated array, and the smaller arrays are then processed by the NN in a serial manner.

18. The non-transitory storage medium as recited in claim 16, wherein a size of the NN is independent of a size of the mini-slot of the PRB of the rough channel estimated array.

19. The non-transitory storage medium as recited in claim 11, wherein the smaller arrays produced by the splitting are overlapping arrays.

20. The non-transitory storage medium as recited in claim 11, wherein the NN is the only NN used to process the smaller arrays, and the NN is operable with rough channel estimated arrays of various different sizes.

\*　\*　\*　\*　\*